(12) United States Patent
Glover

(10) Patent No.: US 9,547,925 B2
(45) Date of Patent: *Jan. 17, 2017

(54) FORCE-DIRECTED GRAPHS

(71) Applicant: International Business Machines Corporation, Armonk, NY (US)

(72) Inventor: Raymond S. Glover, Saffron Walden (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/157,946

(22) Filed: May 18, 2016

(65) Prior Publication Data

US 2016/0358353 A1 Dec. 8, 2016

Related U.S. Application Data

(63) Continuation of application No. 14/971,338, filed on Dec. 16, 2015, now Pat. No. 9,418,457, which is a (Continued)

(51) Int. Cl.
*G06T 11/20* (2006.01)
*G06T 9/00* (2006.01)
*G06T 7/00* (2006.01)

(52) U.S. Cl.
CPC .......... *G06T 11/206* (2013.01); *G06T 7/0093* (2013.01); *G06T 9/00* (2013.01); *G06T 2200/24* (2013.01);
(Continued)

(58) Field of Classification Search
CPC ...... G06T 11/02; G06T 11/206; G06T 7/0093; G06T 91/00; G06T 2200/24; G06T 2207/20072; G06T 2207/20136; G06N 5/02; G06N 5/04; G06N 99/00; H04L 12/26
(Continued)

(56) References Cited

U.S. PATENT DOCUMENTS 5,995,114 A   11/1999   Wegman et al.
7,966,143 B1   6/2011   Koren et al.
(Continued)

FOREIGN PATENT DOCUMENTS

CN   104217073 A   12/2014

OTHER PUBLICATIONS

Lin C. et al., "A new force-directed graph drawing method based on edge-edge repulsion", Journal of Visual Languages and Computing, 23, 2012, pp. 29-42.*
(Continued)

*Primary Examiner* — Stanley K Hill
*Assistant Examiner* — Dave Misir
(74) *Attorney, Agent, or Firm* — Alexa L. Ashworth

(57) ABSTRACT

Embodiments of the present invention provide systems and methods for graphing networks. In one embodiment, a dampening heuristic is utilized to graph networks to increase their stability. Nodes are visualized by finding local and global minima and equilibrium positions. Factors such as the influence of neighboring nodes; attraction and repulsion phases; and dynamism of complex networks are addressed by embodiments of the present invention. The stability of nodes are measured quantitatively using vectors, degree of influence of neighboring nodes on other nodes, and updating dampening heuristics.

1 Claim, 4 Drawing Sheets

Related U.S. Application Data continuation of application No. 14/731,837, filed on Jun. 5, 2015.

(52) U.S. Cl.
CPC ........... *G06T 2207/20072* (2013.01); *G06T 2207/20136* (2013.01)

(58) Field of Classification Search
USPC .......................................................... 706/46
See application file for complete search history.

(56) References Cited

U.S. PATENT DOCUMENTS

| | | | |
|---|---|---|---|
| 2005/0180330 A1* | 8/2005 | Shapiro | G06T 11/206 370/241 |
| 2006/0290697 A1 | 12/2006 | Madden et al. | |
| 2008/0319719 A1* | 12/2008 | Grose | G06T 11/206 703/2 |
| 2009/0287991 A1 | 11/2009 | Nakamura et al. | |
| 2011/0047455 A1 | 2/2011 | Funes et al. | |
| 2013/0232452 A1 | 9/2013 | Krajec et al. | |
| 2014/0317019 A1 | 10/2014 | Papenbrock et al. | |
| 2015/0012902 A1 | 1/2015 | Zhao et al. | |

OTHER PUBLICATIONS

Bruβet al.; "Fast Interactive 3-D Graph Visualization"; GD '95 Proceedings of the Symposium on Graph Drawing; Sep. 20, 1995; pp. 99-110; Springer-Verlag; London, UK.

Dobson et al.; "Stability, Instability, and Error of the Force-Based Quasicontinuum Approximation"; Mar. 8, 2009; pp. 1-18.

Frick et al.; "A Fast Adaptive Layout Algorithm for Undirected Graphs (Extended Abstract and System Demonstration)", 1995; pp. 1-16.

Hu, Yifan; "Efficient and High Quality Force-Directed Graph Drawing"; The Mathematica Journal; 2005; pp. 1-37; vol. 10.

Glover; U.S. Appl. No. 14/731,837, filed Jun. 5, 2015; Entitled "Force-Directed Graphs".

Glover: U.S. Appl. No. 14/971,338, filed Dec. 16, 2015; Entitled "Force-directed Graphs".

Jacomy et al.; "ForceAtlas2, A Continuous Graph Layout Algorithm for Handy Network Visualization"; Aug. 1, 2012; pp. 1-22.

List of IBM Patents or Patent Applications Treated As Related; Dated Jul. 12, 2016; 2 pages.

* cited by examiner

FORCE-DIRECTED GRAPHS

BACKGROUND OF THE INVENTION

The present invention relates generally to the field of visualizing graphs and more specifically to using a dampening phase in heuristic approaches to graph layout to increase their stability.

Generic network layout algorithms are typically designed to generate aesthetically pleasing visualizations. The visualizations of these networks are graphs containing points referred to as nodes which are connected by straight line segments referred to as edges. Force-directed algorithms are a heuristic approach utilized to generate the visualizations. The force-directed algorithms may not be as effective at generating aesthetically pleasing visualizations with larger or more complex networks. Iterations, attractive forces, repulsive forces, and dynamism of nodal positions lead to difficulties in generating aesthetically pleasing visualizations. Addressing these factors can be difficult, as the interplay between these factors are not readily resolved.

SUMMARY

According to one embodiment of the present invention, a method for visualizing elements of a graph is provided with the method comprising the steps of: determining, by one or more processors, a value associated with an interaction between a set of forces; determining, by one or more processors, a position of a set of at least two nodes, based on the value associated with the interaction between the set of forces; determining, by one or more processors, an impact value of a first node of the at least two nodes on a position of a second node of the at least two nodes; calculating, by one or more processors, a relative stability value of the first node of the at least two nodes; and displaying, by one or more processors, the at least two nodes in a graph.

Another embodiment of the present invention provides a computer program product for visualizing elements of a graph, based on the method described above.

Another embodiment of the present invention provides a computer system for visualizing elements of a graph, based on the method described above.

DETAILED DESCRIPTION

Networks are visualized using nodes and edges which connect the nodes. As networks are more complex and dynamic, obtaining aesthetically pleasing visualizations in an efficient manner becomes more difficult. In the more complex and dynamic networks, achieving a natural resting state for certain nodes is not feasible and hence difficult to visualize. Addressing factors such as speed of computation (i.e., efficiency), dynamic changes, attractions, repulsions, etc. in order to generate high quality visualizations of more complex and dynamic networks is ineffective. Addressing one factor may negatively impact an additional, or multiple other factors, and thus does not resolve the issue of generating aesthetically pleasing visualizations of larger or more complex networks. Embodiments of the present invention provide systems and methods for addressing multiple factors without negatively impacting other factors, while generating high quality visualizations of more complex and dynamic networks.

Figure 1:
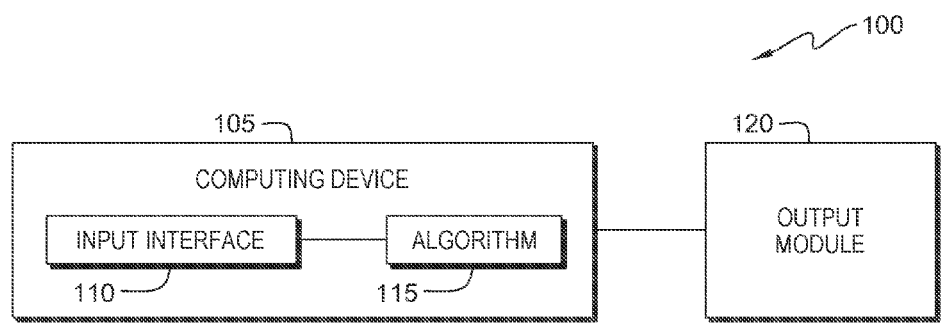
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes output module 120 and computing device 105.

Output module 120 can be, for example, a monitor or any type of device which can display a set of graphics. Output module 120 may include internal or external hardware components, as depicted and described in further detail with respect to FIG. 5.

Computing device 105 includes algorithm 115 and input interface 110. Computing device 105 may be a laptop computer, a tablet computer, a netbook computer, a personal computer (PC), a desktop computer, a personal digital assistant (PDA), a smart phone, a thin client, or any programmable electronic device capable of communicating with output module 120. Computing device 105 may include internal and external hardware components, as depicted and described in further detail with respect to FIG. 5.

Input interface 110 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. Input interface 110 is capable of receiving data, user commands, and data input modifications from a user and is capable of communicating with algorithm 115. In some embodiments, input interface 110 may be integrated with algorithm 115.

In this exemplary embodiment, algorithm 115 consists of a heuristic approach to generate a network of nodes and the edges which connect the nodes. Algorithm 115 incorporates force-directed methods which take into account repulsion phases and attraction phases in order to calculate the position of nodes. An iterative approach converges to a solution (i.e., "coming to same solutions after multiple trials") in order to find equilibria and critical points such as energy minima (and maxima) positions. In dynamical instances, changes in the repulsion and the attraction phases make high-quality visualization of nodes difficult. Algorithm 115 applies a dampening phase in order to address dynamical considerations. Algorithm 115 measures (on each iteration)

how stable a node is in relation to those around it (i.e., the neighborhood surrounding the node), and to calculate a "dampening factor" which gets incorporated into other parts of the algorithm on subsequent iterations.

Figure 2:
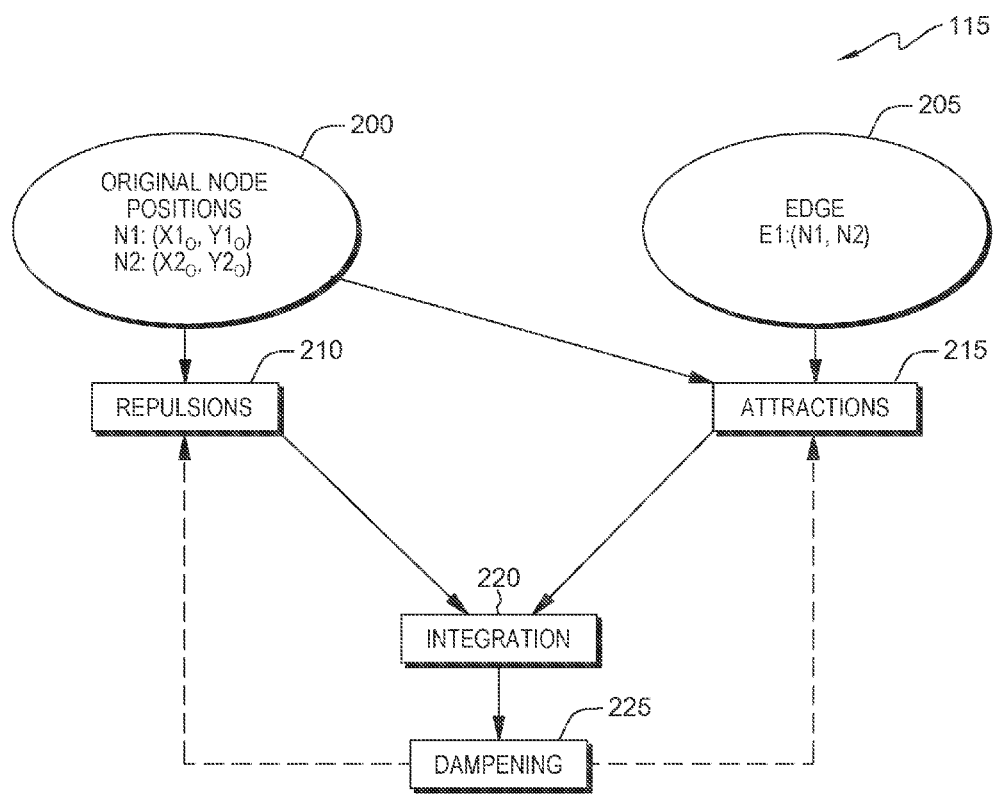
FIG. 2 is a functional block diagram depicting operational steps for utilizing a stability heuristic in order to determine the position of nodes, in accordance with an embodiment of the present invention.

FIG. 2 is a functional block diagram depicting operational steps for utilizing a stability heuristic in order to determine the position of nodes, in accordance with an embodiment of the present invention.

In step 200, algorithm 115 receives the original node positions of two nodes—N1 and N2. In other instances, algorithm 115 can receive the positions of more than two nodes. In this exemplary embodiment, the positions of the nodes are in 2-dimensions in terms of Cartesian coordinates in the x-y plane. In other embodiments, the positions of nodes are in 3-dimensions in terms of Cartesian coordinates in the x, y, and z plane. The nodes are points which can experience repulsions (forces which repel nodes away from each other) and can experience attractions (forces which bring nodes toward each other). Since a particular node can experience forces which repel the particular node from other nodes, and can experience forces which attract the particular node to other nodes, all of the nodes are sent to both a repulsions phase and an attractions phase.

In step 205, algorithm 115 receives edges which connect two nodes. In this exemplary embodiment, only a single edge—E1—eventually connects N1 and N2. In other embodiments, algorithm 115 can work with various numbers of edges. E1 is a straight line segment. In other embodiments where there are multiple nodes, the nodes are connected by edges which are all of uniform length. The uniform length of the edges makes the network more visually pleasing. In FIG. 2, the arrow from step 205 points toward step 215, which represents the attractions phase. By definition, edges are only associated with attractive forces and thus edges are applied to nodes when there is sufficient attraction to connect them.

In step 210, algorithm 115 performs calculations to determine repulsions between nodes. Repulsions are calculated in order to find the separation between a set of nodes. More specifically, force-directed methods are employed to determine the repulsions amongst all nodes. Established force-directed methods or newer force-directed methods can be employed by algorithm 115. There are multiple ways of applying force-directed methods to repelling elements within a network of nodes, such as Coloumbic laws for spherical charges. In this exemplary embodiment, a heuristic approach is utilized because the optimal solution is too complex and computationally demanding. The node positions act as an input where the repulsion phase incorporates inverse-gravitational forces which repel all nodes from one another. For example, inverse-gravitational functionals in algorithm 115 may be used on a network of nodes in order to describe the Van der Waal Forces in a molecular system. Molecular systems are complex and have particles on at least the $\sim 10^{23}$ magnitude. The particles are treated as individual nodes. The orientation of charges with respect to one another dictate the nature of repulsions which would take place among the inherent electric dipoles. If two negative charges or two positive charges are in close proximity to each other, there will be inherent repulsions. Force-directed methods aim to find "energy minimum" positions, however repulsions increase the energy (i.e., move the position of two nodes away from each other). As two nodes move infinitesimally closer to each other, the energy becomes infinitely high and moves away from an optimal energy minimum.

In step 215, algorithm 115 performs calculations to determine attractions between nodes. Attractions are calculated in order to determine the "pairing" of a set of nodes. More specifically, force-directed methods are employed to determine the attractions amongst all nodes. There are multiple ways of applying force-directed methods to attracting elements within a network of nodes, such as Hooke's Law for attractive forces resembling a spring connecting two endpoints together. In this exemplary embodiment, a heuristic approach is utilized because the optimal solution is too complex and computationally demanding. The node positions and edges act as an input where the attraction phase incorporates forces which attract nodes to one another. For example, Hooke's Law in algorithm 115 is used on a network of nodes in order to describe the Van der Waal Forces from the molecular system above. Once again, the particles are treated as individual nodes. The orientation of charges with respect to one another dictate the nature of attractions which would take place among the inherent electric dipoles. If a negative charge and a positive charge are within close proximity to each other, there will be an inherent attraction. Force-directed methods aim to find "energy minimum" positions with attractive forces decreasing the energy (i.e., move the position of two nodes toward each other). The edges can be described as a bond (i.e., attraction) between two nodes separated by an optimal distance and thus by definition edges are not inputted into the repulsion phase in step 210. If two nodes are too far apart, the charge attraction forces among inherent electric dipoles are not (and cannot) be exerted on each other. In such an instance, the energy is substantially higher than the desired energy minimum. If the attractive forces are too great among the nodes, the system collapses further illustrating the importance of the optimal distance.

In step 220, algorithm 115 undergoes the integration phase. Integration merges the effects of repulsion and attraction. In this exemplary embodiment, the calculated forces of repulsion in step 210 and the calculated forces of attraction in step 215 are combined to produce new node positions. As an option, the phase may use a step-size as an input for step 220. To increase the efficiency and speed in order to generate a network layout of nodes, a standard technique to accomplish this is to increase the amount of work done per iteration via the step-size. The step-size is global in nature, meaning the step-size treatment is monolithically applied to a system, even if the system has sub-systems where a monolithic technique is not an appropriate method. The inherent heterogeneity and dynamism of certain systems make a monolithic method, such as the step-size treatment, a questionable and distracting method for visualizing areas of these systems. A natural resting state (i.e., "energy minimum) is not realized when utilizing the step-size. Regardless of the input, the integration phase measures the displacement (Disp) of the nodes. For example, the two nodes—N1 and N2—interact with one another. Both are neutral points as a whole with inherent electric dipoles where the opposite sides attract. Dynamic factors within each node induce repulsions, however, these induced repulsions are far weaker than the attraction of the inherent electric dipoles. There will be a net displacement (Disp≠0) from the original positions bringing the two nodes closer to each other.

In step 225, algorithm 115 performs the dampening heuristic. In this exemplary embodiment, the dampening heuristic is used to address the changing and dynamic nature of certain systems to better visualize interactive systems. The dampening heuristic of algorithm 115 can be applied to different types of systems in addition to interactive systems and can be plugged in to existing force-based algorithms. Issues addressed by the dampening heuristic include: improving run-time performance (i.e., increasing the amount of work done per iteration); laying out sub-regions of more complex networks of nodes correctly before equilibria or energy minima are met; and accommodating topological changes from nodes and edges being inserted and removed while algorithm 115 is running. The stability of a particular node is measured by the stability of the particular node in relation to other nodes around it (the particular node's neighbourhood). Then, a calculated "dampening factor" gets fed in to other parts of the algorithm on subsequent iterations. The dampening heuristic maintains an amount of dampening, d, for each node in the network. On each iteration of the algorithm, the changes to the positions (displacements) of the nodes are analysed and as a result, the levels of dampening are adjusted depending on node stability where stable nodes receive less dampening (have more freedom of movement) and unstable nodes receive more dampening, until they reach a stable state. A stable node state is a state where the node has freedom to move about but does not move. For example, this heuristic works well across networks of varying sizes consisting of varying number of nodes, edges, and structures. The individual nodes are less sensitive to very large or small step-sizes (which are global in nature) indicating that the additional input from the dampening heuristic is outweighed by the larger step-sizes and thus total-running times are reduced. The dampening is also effective at keeping inactive regions of a graph steady while topological changes concomitantly occur in other parts of the graph.

Figure 3:
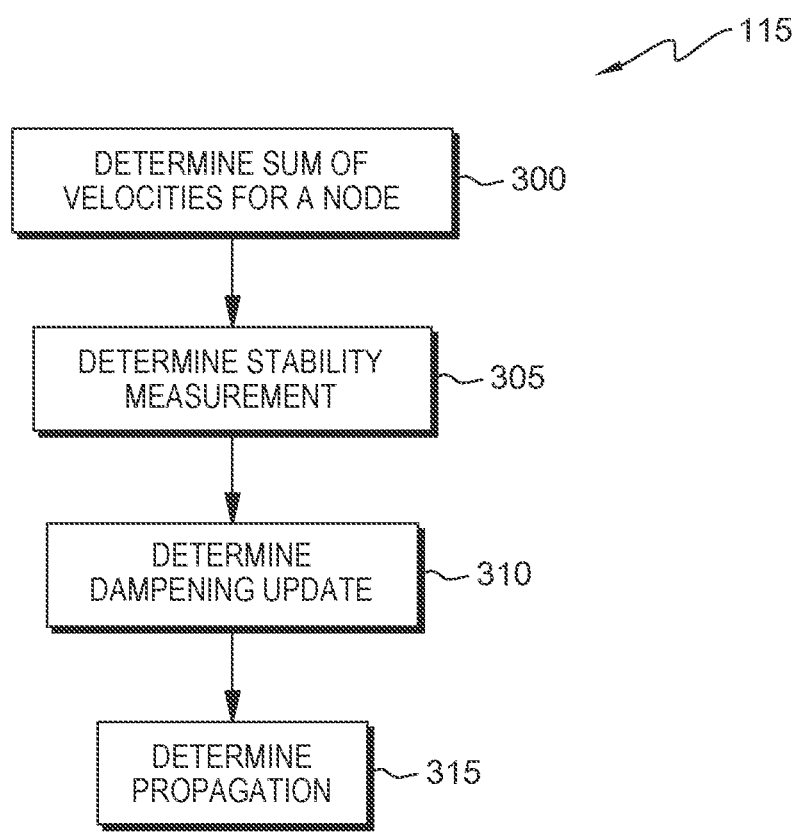
FIG. 3 is a flowchart depicting the operational steps for implementing the dampening heuristic, in accordance with an embodiment of the present invention.

FIG. 3 is a flowchart depicting the operational steps for implementing the dampening heuristic, in accordance with an embodiment of the present invention.

In step 300, algorithm 115 determines the sum of velocities for a node of interest by taking into account adjacent and nearby nodes. The displacement of nodes, which is denoted as Disp, acts as the input to produce the sum velocity of the nodes incident to a given node, where the nodes in its open neighbourhood are denoted as N(v), the velocity of the node of interest is $Disp_v$ and the velocity of a neighbouring node, hoodVel(v), is:

$$hoodVel(v) = \frac{\sum_{vAdj=N(v)} Disp_{vAdj}}{|N(v)|} \quad \text{(Eq. 1)}$$

Also, the velocities of neighbouring nodes can be found in linear time by traversing the edge list once.

In step 305, algorithm 115 determines the stability measurement of a node of interest. Using the velocity of a particular node ($Disp_v$) and its neighbourhood velocity (hoodVel(v)), followed by normalization as shown in Eq. 2, produces a value between −1 (very unstable) and 1 (very stable).

$$stability(v) = \frac{Disp_v}{\|Disp_v\|} \cdot \frac{hoodVel(v)}{\|hoodVel(v)\|} \quad \text{(Eq. 2)}$$

The dot product of these two velocity vectors determines an angle between the two vectors. Further details with respect to the velocity of the particular node and its neighbourhood velocity are described in FIG. 4.

In step 310, algorithm 115 determines the dampening update. A change in the stability of a node can dictate the amount of dampening for that node in the next iteration of the algorithm, using Eq. 3.

$$Dampening_v = \left(1 - \frac{1}{deg(v)^3}\right) \cdot stability(v) \cdot \begin{cases} \alpha & \text{if stability}(v) \geq 0 \\ \beta & \text{if stability}(v) \leq 0 \end{cases} \quad \text{(Eq. 3)}$$

Constants $\alpha$ and $\beta$ control the rate of change in the dampening of nodes, depending on the stable or unstable states, respectively. Values of 0.001 and 0.1 are selected, with $\alpha$ being the smaller end of the range assuming that the graph should only be allowed to be in an unstable state for shorter periods of time. The role of $deg(v)^2$ (the square of the degree of the node) is used to spread out, over several iterations, the influence nodes of a higher degree receive from their neighbours in order to prevent the violent oscillations that such nodes can otherwise be prone to. The degree of the node is described in further detail with respect to FIG. 4.

In step 315, algorithm 115 determines propagation. Now that the node dampening has been updated, algorithm 115 can use $Dampening_v$ in the repulsion and attraction phases in steps 210 and 215 of FIG. 2, respectively. An efficient way to do this is to simply scale the output forces of each node by the dampening of that node:

$$Force_v \cdot (1 - Dampening_v) \quad \text{(Eq. 4)}$$

Eq. 4 accounts for changes in the system and relaying it to the repulsion and attraction phases.

Figure 4:
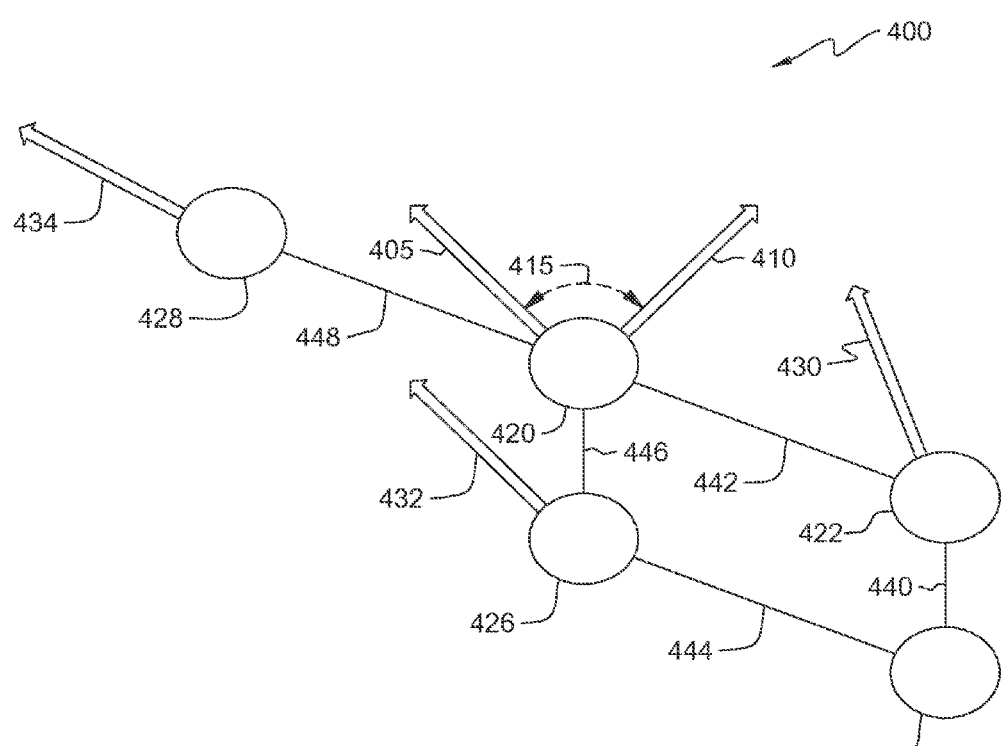
FIG. 4 is an example of a network of nodes with velocity vectors, in accordance with an embodiment of the present invention.

FIG. 4 is an example of a network of nodes with velocity vectors, in accordance with an embodiment of the present invention.

In this exemplary embodiment, a network of nodes are depicted. Nodes 420, 422, 424, 426, and 428 are connected by edges 440, 442, 444, 446, and 448. Neighboring nodes influence the stability of a node. For example, node 420 is connected: to node 422 via edge 442; to node 426 via edge 446; and to node 428 via edge 448. Arrows 430, 432, and 434 are velocity vectors for nodes 422, 426, and 428, respectively.

In this exemplary embodiment, the node of interest is node 420. Node 420 has two vectors, 405 and 410, which are the velocity vectors, hoodVel(v) and $Disp_v$, respectively. The dot product of vectors 405 (which is associated with the neighboring nodes) and 410 (which is associated with the node of interest) generates angle 415. The angle between the hoodVel(v) and $Disp_v$ vectors (i.e., angle 415) measures the stability of the nodal position.

In this exemplary embodiment, the degree of the node is the number of edges incident to a node, with the loop incident to the node counting for two degrees. For example, node 428 has a degree of 1 (as only a single edge, edge 448, connects to node 428) whereas node 420 has a degree of 3 (as three edges, edges 442, 446, and 448, connect to node 420). Nodes with a degree of 1 are not influenced by dampening, as at least a node with a degree of 2 is required in order to be influenced by dampening. The rest of the algorithm is calibrated to work correctly for nodes with a degree of 1, and thus expected to stabilize naturally.

Figure 5:
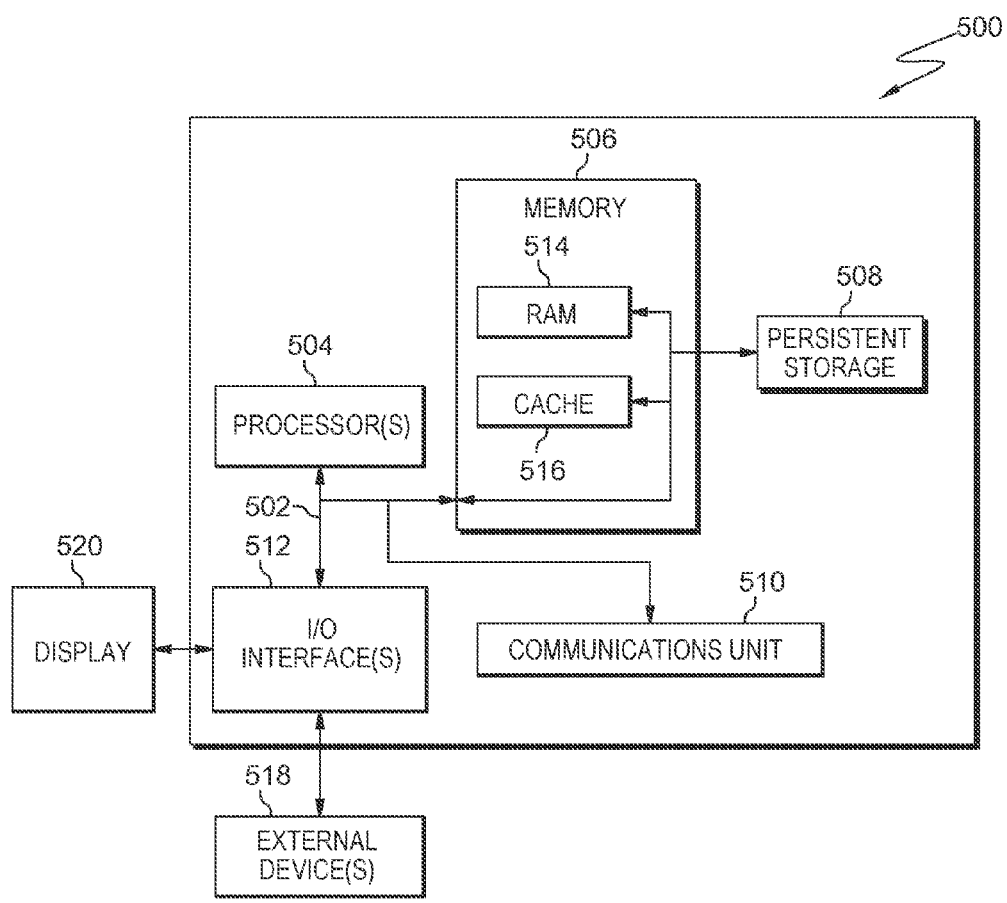
FIG. 5 depicts a block diagram of internal and external components of a computing device, in accordance with an embodiment of the present invention.

FIG. 5 depicts a block diagram of components of a computing device, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for visualizing elements of a graph of a set of at least two nodes, the computer program product comprising:
  a computer readable storage medium and program instructions stored on the computer readable storage medium, the program instructions comprising:
  responsive to combining a set of attractive forces and a set of repulsive forces of the set of at least two nodes, program instructions to generate a set of new node positions;
  program instructions to determine a position of the set of at least two nodes is based on a set of vectors of the set of at least two nodes, wherein each node is a common point to the set of vectors and is associated with an angle;
  program instructions to calculate a relative stability value of a first node of the set of at least two nodes based on a dampening heuristic, wherein the dampening heuristic is based on: a degree of nodes, any variations in vector magnitude due to non-resting states and to fluxional stability of the at least two nodes, and any changes in the set of attractive forces and the set of repulsive forces of the set of at least two nodes;
  wherein the fluxional stability indicates a level of dynamic behavior exhibited by the at least two nodes;
  program instructions to assess a position of the set of at least two nodes as either a global minimum, a local minimum, or an equilibrium; and
  program instructions to display the set of at least two nodes in the graph by linking at least two nodes from the set of new node positions with an edge, based, at least in part, on: the set of attractive forces and the set of repulsive forces, a distance, and the relative stability value determined to be above a threshold value.

* * * * *